United States Patent
Brooks et al.

(10) Patent No.: US 9,170,632 B2
(45) Date of Patent: Oct. 27, 2015

(54) PROVIDING WAKEUP LOGIC TO AWAKEN AN ELECTRONIC DEVICE FROM A LOWER POWER MODE

(75) Inventors: Robert C Brooks, Houston, TX (US); Michael Richard Durham, Houston, CA (US); Mark D Tupa, Houston, TX (US); Louis B Hobson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 13/806,098

(22) PCT Filed: Jun. 25, 2010

(86) PCT No.: PCT/US2010/039906
§ 371 (c)(1),
(2), (4) Date: Dec. 20, 2012

(87) PCT Pub. No.: WO2011/162766
PCT Pub. Date: Dec. 29, 2011

(65) Prior Publication Data
US 2013/0103961 A1    Apr. 25, 2013

(51) Int. Cl.
*G06F 1/26* (2006.01)
*G06F 1/32* (2006.01)
*H04L 12/12* (2006.01)

(52) U.S. Cl.
CPC ............ *G06F 1/3206* (2013.01); *G06F 1/3203* (2013.01); *G06F 1/3209* (2013.01); *G06F 1/3278* (2013.01); *H04L 12/12* (2013.01);
(Continued)

(58) Field of Classification Search
CPC ....... G06F 1/3202; G06F 1/3231; G06F 1/26; G06F 1/206; G06F 1/3228; G06F 1/08; G06F 1/266; G06F 1/3289; H04L 12/12; H04L 12/10
USPC .................................. 713/300, 310, 320, 330
See application file for complete search history.

(56) References Cited

U.S. PATENT DOCUMENTS 5,878,264 A * 3/1999 Ebrahim ................... 713/323
6,351,818 B1 * 2/2002 Murai ......................... 713/300
(Continued)

FOREIGN PATENT DOCUMENTS

CN         1595331 A      3/2005

OTHER PUBLICATIONS

WIPO, International Search Report dated Feb. 25, 2011, PCT /US2010/039906 filed Jun. 25, 2010.
(Continued)

*Primary Examiner* — Zahid Choudhury
(74) *Attorney, Agent, or Firm* — Hewlett-Packard Patent Development

(57) ABSTRACT

An electronic device (100) includes a network interface controller (102) and an input/output controller (110, 202) having a link layer. A portion of the input/output controller is configured to be powered off during a lower power mode of the electronic device, where the first portion contains the link layer. Wakeup logic (108) separate from the input/output controller receives a wake indication from the network interface controller in response to the physical layer receiving a wake message on the network while the electronic device is in the lower power mode. The wakeup logic activates an indication to awaken the electronic device from the lower power mode in response to the wake indication from the network interface controller.

19 Claims, 3 Drawing Sheets

(52) U.S. Cl.
CPC ............... *Y02B60/126* (2013.01); *Y02B 60/32* (2013.01); *Y02B 60/34* (2013.01); *Y02B 60/35* (2013.01)

(56) References Cited

U.S. PATENT DOCUMENTS

| | | | |
|---|---|---|---|
| 6,591,368 B1 | 7/2003 | Ryu | |
| 6,606,712 B1 * | 8/2003 | Miura | 713/320 |
| 7,047,428 B2 | 5/2006 | Bui | |
| 7,073,077 B1 | 7/2006 | Gavlik | |
| 7,103,785 B2 | 9/2006 | Green et al. | |
| 7,243,220 B2 | 7/2007 | Hsu | |
| 8,345,673 B1 * | 1/2013 | Lo et al. | 370/366 |
| 2005/0033955 A1 | 2/2005 | Hsu | |
| 2005/0144488 A1 * | 6/2005 | Lee et al. | 713/300 |
| 2006/0067357 A1 | 3/2006 | Rader | |
| 2007/0076747 A1 * | 4/2007 | Zinaty | 370/463 |
| 2008/0229091 A1 | 9/2008 | Abu-Akel | |
| 2008/0250258 A1 * | 10/2008 | Kuo et al. | 713/322 |
| 2008/0320492 A1 | 12/2008 | James et al. | |
| 2009/0133040 A1 | 5/2009 | Stevens | |
| 2009/0193109 A1 | 7/2009 | Kuo et al. | |
| 2010/0002610 A1 | 1/2010 | Bowser et al. | |
| 2010/0122098 A1 | 5/2010 | Kay | |
| 2011/0246798 A1 * | 10/2011 | Bilgin et al. | 713/310 |

OTHER PUBLICATIONS

Office Action, CN Application No, 201080067713.X, Date issued: Jan. 22, 2015, pp. 1-5.

* cited by examiner

PROVIDING WAKEUP LOGIC TO AWAKEN AN ELECTRONIC DEVICE FROM A LOWER POWER MODE

BACKGROUND

Electronic devices, such as computers, electronic appliances, gaming modules, personal digital assistants, and so forth, have various internal electronic components. When an electronic device is idle, it is desirable to place the electronic device into a lower power mode by powering off certain internal electronic components to reduce power consumption. When activity resumes, the electronic device is awakened from its lower power mode.

BRIEF DESCRIPTION OF THE DRAWINGS

Some embodiments are described with respect to the following figures.

DETAILED DESCRIPTION

Figure 1:
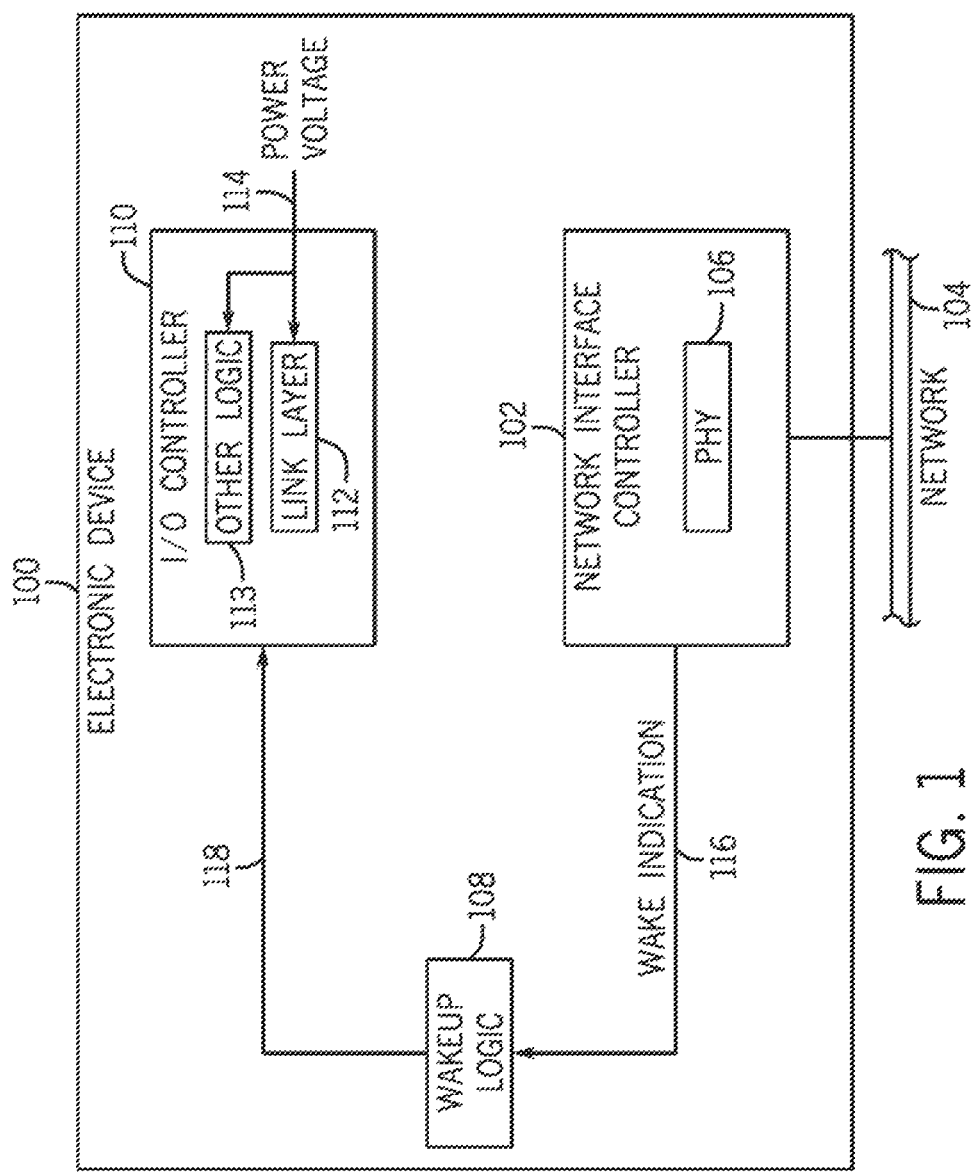
FIG. 1 is a block diagram of an example system incorporating some embodiments.

After an electronic device (e.g., computer, electronic appliance, personal digital assistant, etc.) has been placed into a lower power mode (e.g., standby mode, hibernation mode, and so forth), certain activities can cause the electronic device to be awakened from the lower power mode. In the lower power mode, various electronic components of the electronic device are powered off. Increasing the number of electronic components of the electronic device that are powered off typically leads to increased power savings. Generally, a "lower power mode" of an electronic device refers to a mode of the electronic device in which certain component(s) of the electronic device are powered off to achieve power savings as compared to a normal mode of operation. To ensure that the electronic device can be awakened from its lower power mode in response to certain activities, some of the electronic components of the electronic device remain powered during the lower power mode of the electronic device.

One of the activities that can cause the electronic device to be awakened from the lower power mode is a wake message received over a network to which the electronic device is connected. The network can be a wired network or a wireless network. In some examples, the wake message can be a wake-on-LAN (local area network) message—a wake-on-LAN message is also sometimes referred to as a magic packet. The LAN can be a wired LAN or a wireless LAN. The magic packet is a broadcast packet that contains a predefined payload. In some examples, the predefined payload includes a predefined value in combination with an address of the electronic device that is to be awakened by the magic packet. In other examples, a wake message can have other predefined formats. Instead of being a broadcast packet, the wake message can be a message targeted to a particular electronic device.

To be able to be awakened by a wake message received over a network, certain network interface components are powered even while the electronic device is in a lower power mode. One such component is a physical layer of a network interface controller. Moreover, another layer that typically remains powered is a link layer that is above the physical layer. Such link layer of an electronic device typically remains fully powered to be able to process a wake message received over a network from a link layer of a sending device.

Maintaining both the physical layer and the link layer fully powered while the electronic device is in the lower power mode can cause power consumption of the electronic device to rise above a target power consumption threshold. In some examples, the target power consumption threshold can be set by a government regulatory agency or by a standard. In specific examples, the power threshold can be 1.2 watts—in other words, while the electronic device is in the lower power mode, it is desired that the electronic device consume less than or equal to 1.2 watts of power to satisfy government regulation or a standard.

Although reference is made to 1.2 watts as a power consumption threshold in specific examples, it is noted that other power consumption thresholds can be set in other examples. Also, the power consumption threshold does not have to be set by government regulation or a standard—rather the power consumption threshold can be a target value set by the manufacturer or seller of an electronic device, or by some other entity.

In some implementations, the link layer is a media access control (MAC) layer, which provides addressing and channel access control mechanisms. The MAC layer provides an interface between the physical layer and a higher protocol layer of the electronic device. In some example implementations, the MAC layer is an interface between the physical layer and a logical link control (LLC) layer, which provides flow control for packets communicated over a network. According to the OSI (open system interconnection) model, the LLC layer and the MAC layer are considered sub-layers of a data link layer (or layer two). Although reference is made to the MAC layer in some implementations, it is noted that other types of link layers can be used in other implementations.

In accordance with some embodiments, to further conserve power while an electronic device is in a lower power mode, a link layer residing in an input/output (I/O) controller of an electronic device remains powered off while the electronic device is in the lower power mode. Even with the link layer in the I/O controller powered off, the electronic device remains enabled to respond to a wake message received over a network. The ability to respond to such wake message is provided by using wakeup logic that is implemented as a separate device from the I/O controller—the wakeup logic is able to detect that a network interface controller has received the wake message. Note that conventionally it is the I/O controller that detects that the network interface controller has received the wake message.

An example electronic device 100 is shown in FIG. 1, which has a network interface controller 102 connected to a network 104 (wired network or wireless network). The network interface controller 102 can be implemented as a network interface chip, such as a PHY chip or other type of chip. A "PHY chip" refers to an integrated circuit chip that implements physical layer functionality. Alternatively, the network interface controller 102 can be part of another controller in the electronic device that also performs other functions.

The network interface controller 102 includes a physical layer 106 (represented as "PHY" in FIG. 1), which provides the lowest level interface to physical transmission media implementing the network 104, where the physical transmission media can include electrical wires, optical fiber links, or wireless links. The electronic device 100 also includes a wakeup logic 108 that is separate from an input/output (I/O) controller 110. In some examples, the wakeup logic 108 can be a discrete logic device separate from the I/O controller 110. The I/O controller 110 includes a link layer 112 (among other components). Note that in implementations as depicted in FIG. 1, the link layer 112 is provided in a part or device (e.g., I/O controller 110) that is separate from the network interface controller 102.

The link layer 112 receives a power voltage 114, where a "power voltage" refers to a voltage output by a power system of the electronic device 100. The power voltage 114 can also be used to power other logic 113 in the I/O controller 110. During normal operation, the link layer 112 in the I/O controller 110 cooperates with the physical layer 106 in the network interface controller 102 to perform data communications over the network 104. For example, if the link layer 112 is implemented as a MAC layer, then the MAC layer can communicate frames containing MAC addresses over the network 104, where the MAC addresses in each frame are used to switch the frame between network devices.

The link layer 112 and the physical layer 106 are part of a communication stack of protocol layers in the electronic device that operate according to respective protocols to allow the electronic device to communicate over the network 104. For example, another protocol layer in the communication stack can be an Internet Protocol (IP) layer for implementing IP communications over the network 104. Yet another protocol layer in the communication stack is a transport layer, such as a Transmission Control Protocol (TCP) layer or User Datagram Protocol (UDP) layer.

During a lower power mode of the electronic device 100, the power voltage 114 to the link layer 112 is deactivated, such that the link layer 112 (and the other logic 113) is powered off. With the link layer 112 powered off, conventional electronic devices would not be able to be awakened in response to a wake message received over the network 104. However, in accordance with some implementations, the separate wakeup logic 108 is interposed between the network interface controller 102 and the I/O controller 110 to allow the wakeup logic 108 to receive a wake indication 116 from the network interface controller 102, in response to the physical layer 106 receiving a wake message over the network 104.

In response to the wake indication 116, the wakeup logic 108 asserts an indication 118 to the I/O controller 110, where the activated indication 118 is to cause the I/O controller 110 to perform tasks to awaken the electronic device 100 from the lower power mode. Awakening the electronic device 100 from the lower power mode causes activation of power to components of the electronic device 100 that were powered off in the lower power mode. For example, the power voltage 114 can be activated upon the electronic device 100 awakening from the lower power mode, which causes the link layer 112 (and the other logic 113 connected to the power voltage 114) to be powered up.

By allowing the link layer 112 to remain powered off during the lower power mode, additional power savings can be achieved while still enabling waking the electronic device 100 in response to a network wake message. In some implementations, by deactivating the link layer 112 and the other logic 113 in the I/O controller 110 connected to the power voltage 114, power consumption of the electronic device 100 during the lower power mode can be reduced below a target power consumption threshold, such as a target threshold set by a government regulatory agency, by a standard, or by some other entity. In some examples, this target power consumption threshold can be 1.2 watts, although other example power consumption thresholds can be used in other implementations.

Figure 2:
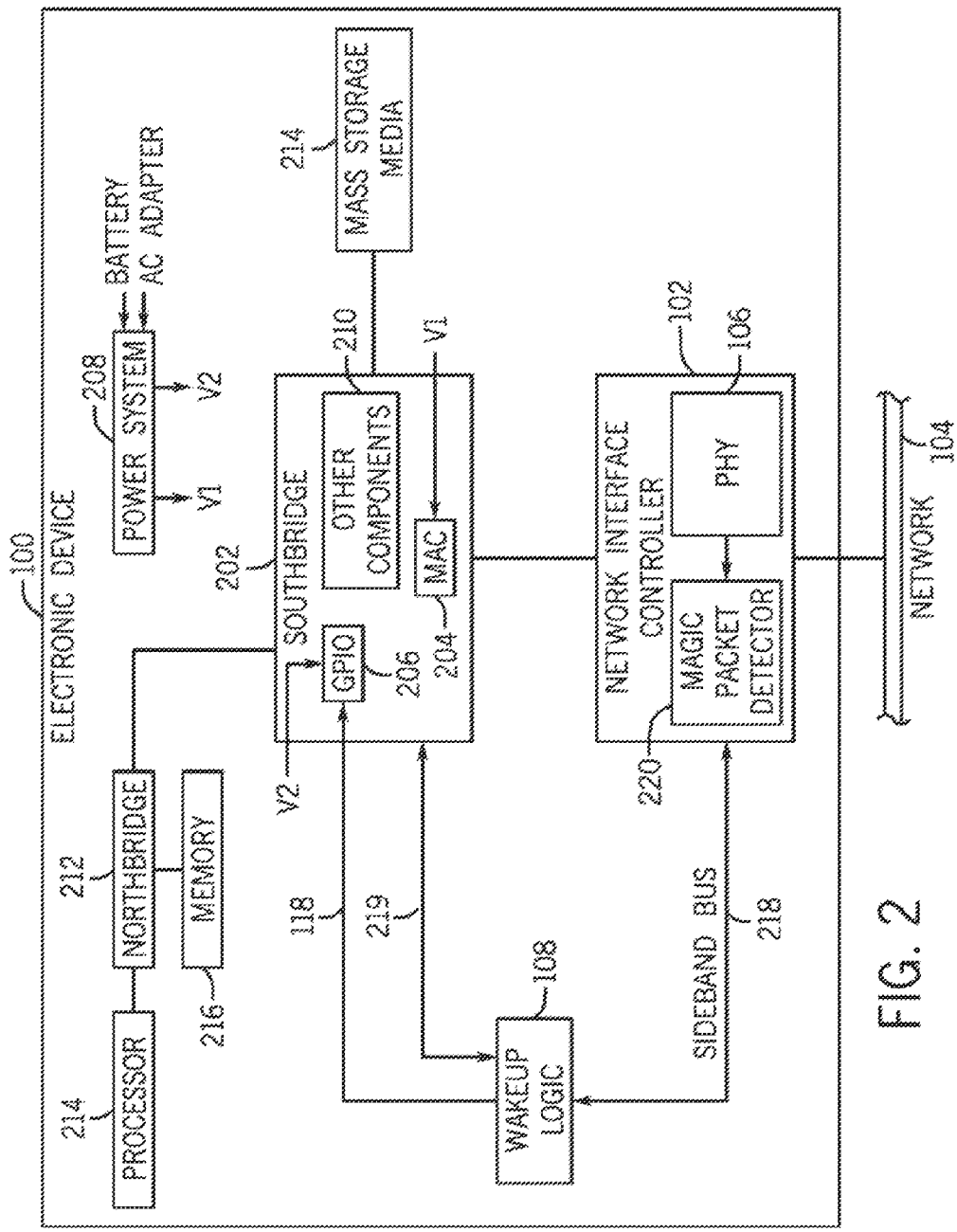
FIG. 2 is a block diagram of another example system incorporating alternative embodiments.

FIG. 2 shows the electronic device 100 according to alternative implementations. In the arrangement of FIG. 2, the I/O controller 110 of the electronic device 100 of FIG. 1 is implemented with a southbridge controller 202. The southbridge controller 202 has a MAC layer 204 (which corresponds to the link layer 112 of FIG. 1) and a general purpose input/output (GPIO) interface 206. The GPIO interface 206 is configurable (or programmable) to cause the GPIO interface 206 to perform predefined tasks. In accordance with some implementations, one of the predefined tasks of the GPIO interface 206 is to respond to the activated indication 118 provided by the wakeup logic 108. The activated indication can be provided to a GPIO input pin that is input to the GPIO interface 206. Although reference is made to the GPIO interface 206 for receiving the activated indication 118 from the wakeup logic 108, it is noted that other implementations can include other circuitry in the southbridge controller 202 for responding to the activated indication 118 to allow for awakening of the electronic device 100 from a lower power mode in response to a network wake message.

In accordance with some implementations, the GPIO interface 206 is configured to provide a wake event in response to the activated indication 118. Consequently, upon receipt of the activated indication 118 at the GPIO interface 206, the southbridge controller 202 recognizes that a wake event has occurred, and the southbridge controller 202 responds by performing tasks to awaken the electronic device 100.

As further shown in FIG. 2, a portion of the southbridge controller 202 including the MAC layer 204 is powered by V1, while the GPIO interface 206 is powered by V2. V1 and V2 are power supply voltages provided by a power system 208 of the electronic device. The power system 208 can receive a battery input (from a battery) and/or an AC adapter input (from an AC adapter). Other power supply voltages can also be produced by the power system 208. Generally, the power system 208 represents the components of the electronic device 100 used to produce and/or deliver power to different parts of the electronic device 100. Such components of the power system 208 can include a power supply, power regulator(s), power rails, and so forth. V1, V2 and other power supply voltages can be provided by different ones of the components of the power system 100.

During lower power mode, V1 can be off, while V2 remains on. During normal operating mode, both V1 and V2 are on.

The southbridge controller 202 includes other components 210 that can also be powered off during lower power mode. These other components 210 can be powered by V1 or alternatively, by other power supply voltages from the power system 208 that are off while the electronic device 100 is in a lower power mode. Examples of the other components 210 that can be included in the southbridge controller 202 include a mass storage controller, an interrupt controller, and an interface to a northbridge controller 212. The mass storage controller is used for managing access of mass storage media 214 (e.g., disk-based storage device(s) or integrated circuit storage device(s)). The interrupt controller of the southbridge controller 202 is used to receive and process interrupts from I/O devices. Although certain example components of the southbridge controller 202 are listed above, it is noted that the southbridge controller 202 can include other or alternative components.

The northbridge controller 212 has an interface to a processor 214, a memory controller to manage access of memory 216, and other logic. In some examples, instead of being separate components, the northbridge controller 212 can be integrated into the processor 214. During lower power mode of the electronic device 200, the processor 214 and northbridge controller 212 can also be powered off.

In certain implementations, the northbridge controller 212 can be referred to as a memory controller hub or an integrated memory controller, and the southbridge controller 202 can be referred to as an I/O controller hub.

As further depicted in FIG. 2, a sideband bus is provided between the network interface controller 102 and the wakeup logic 108 (FIG. 2 depicts a sideband bus segment 218 between the network interface controller 102 and the wakeup logic 108). In some examples, the sideband bus can be an SMBus (system management bus). In some examples, the sideband bus (including segments 218 and 219) is also connected between the network interface controller and the southbridge controller 202 (through the wakeup logic 108). As depicted in FIG. 2, the sideband bus segment 218 is between the network interface controller 102 and the wakeup logic 108, and the sideband bus segment 219 is between the wakeup logic 108 and the southbridge controller 202. The sideband bus segment 218 allows for provision of the wakeup indication 116 (FIG. 1) from the network interface controller 102 to the wakeup logic 108. It is noted that in certain implementations, the southbridge controller 202 has an interface to the sideband bus. However, during lower power mode, this interface of the southbridge controller 202 to the sideband bus is powered off, such that this interface to the sideband bus would not be able to properly respond to the wake indication from the network interface controller 102 that is provided over the sideband bus 218. Instead, the wakeup logic 108 is provided to allow for proper awakening of the electronic device 100 in response to a wake message on the network 104 while the MAC layer 204 and the interface to the sideband bus in the southbridge controller 202 remains powered off in the lower power mode. However, during normal operation (when the system is not in a lower power mode), then the sideband bus segments 218 and 219 are connected through buffers in the wakeup logic 108, such that the interface to the sideband bus in the southbridge controller 202 can interact over the sideband bus (218, 219) with the network interface controller 102.

By interposing the wakeup logic 108 between the network interface controller 102 and the southbridge controller 202, the sideband bus is isolated from the southbridge controller 202 while in the lower power state, in some examples.

As further depicted in FIG. 2, the network interface controller 102 also includes a magic packet detector 220. Upon receiving a packet over the network 104, the received packet is sent by the physical layer 106 to the magic packet detector 220 to allow the magic packet detector 220 to determine whether the received packet is a magic packet, and if so, whether the magic packet is targeted to the electronic device 100. If the magic packet is targeted to the electronic device 100, the magic packet detector 220 activates the wake indication (116 in FIG. 1) over the sideband bus 218.

In alternative implementations, instead of providing the magic packet detector 220, an alternative wake message detector can be used in the network interface controller 102 to recognize other types of wake messages.

Figure 3:
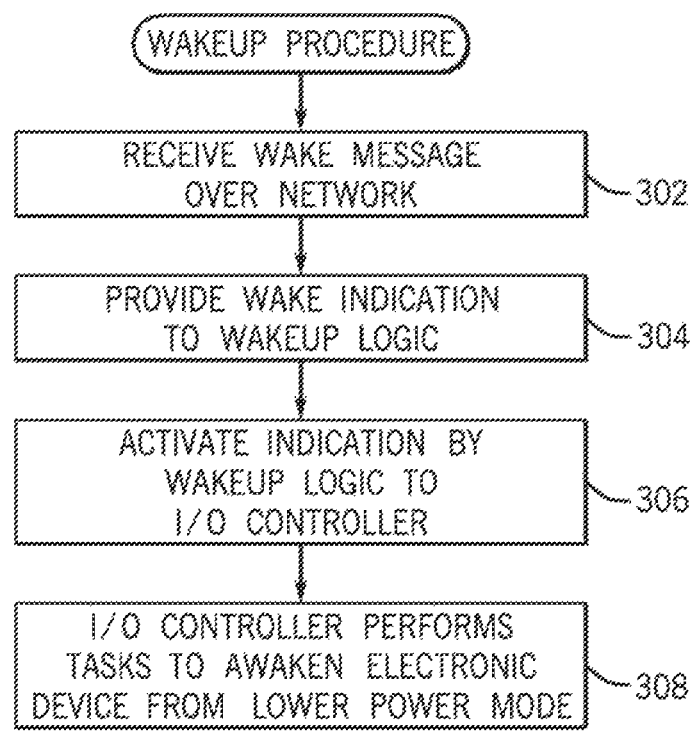
FIG. 3 is a flow diagram of a process of performing wakeup of an electronic device from a lower power mode in response to a wake message received over a network, according to some embodiments.

FIG. 3 is a flow diagram of a process according to some implementations for awakening the electronic device 100 from a lower power mode in response to a wake message. The physical layer 106 of the network interface controller 102 receives (at 302) a wake message over the network 104. As noted above, the wake message can be a magic packet that is sent by a remote node over the network 104, where the magic packet has predefined payload that is recognizable by the receiving network interface controller 102. In response to the wake message, the network interface controller 102 provides (at 304) a wake indication (116 in FIG. 1) to the wakeup logic 108, such as over the sideband bus 218 of FIG. 2. In response to the wake indication, the wakeup logic 108 activates (at 306) an indication (118 in FIG. 1) to the I/O controller 110. In response to the activated indication 118, the I/O controller 110 performs (at 308) tasks to awaken the electronic device 100 from the lower power mode.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An electronic device comprising:
a network interface controller having a physical layer;
an input/output controller having a link layer to cooperate with the physical layer to communicate data over a network, wherein a first portion of the input/output controller is configured to be powered off during a lower power mode of the electronic device, the first portion containing the link layer; and
wakeup logic separate from the input/output controller to receive a wake indication from the network interface controller, wherein the network interface controller is to provide the wake indication in response to the physical layer receiving a wake message on the network while the electronic device is in the lower power mode,
a system management bus (SMBus) coupled to the network interface controller, the wakeup logic and the input/output controller, wherein the wake indication is to be provided by the network interface controller over the SMBus to the wakeup logic and wherein an interface of the input/output controller to the SMBus is powered off in the lower power mode;
wherein the wakeup logic is to activate an indication to awaken the electronic device from the lower power mode in response to the wake indication.

2. The electronic device of claim 1, wherein the wake message on the network for detection by the network interface controller comprises a wake-on-LAN (local area network) message.

3. The electronic device of claim 1, wherein the input/output controller has a second portion configured to remain powered while the electronic device is in the lower power mode, and wherein the second portion includes circuitry to respond to the activated indication from the wakeup logic.

4. The electronic device of claim 3, wherein the second portion includes a general purpose input/output (GPIO) interface configured to provide a wake event in the input/output controller in response to the activated indication, wherein the input/output controller is responsive to the wake event to perform a task to awaken the electronic device from the lower power mode.

5. The electronic device of claim 1, wherein the interface of the input/output controller to the SMBus is incapable of recognizing the wake indication while the first portion is powered off.

6. The electronic device of claim 1, wherein the input/output controller has additional portions that are powered off while the electronic device is in the lower power mode, and wherein the electronic device further has additional electronic components that are powered off during the lower power mode.

7. The electronic device of claim 6, wherein the electronic device is configured to draw less than or equal to 1.2 watts of power while the electronic device is in the lower power mode, while the electronic device maintains an ability to awaken from the lower power mode in response to the wake message.

8. The electronic device of claim 1, wherein the input/output controller is a southbridge controller that includes a mass storage controller, an interrupt controller, and an interface to a northbridge controller, wherein the mass storage controller, interrupt controller, and interface to the northbridge controller are powered off while the electronic device is in the lower power mode.

9. The electronic device of claim 1, wherein the link layer is a media access control (MAC) layer.

10. The electronic device of claim 1, wherein the network interface controller is implemented on an integrated circuit chip.

11. A method of awakening an electronic device from a lower power mode, comprising:
receiving a wake message over a network by a network interface controller of the electronic device that is in the lower power mode, wherein in the lower power mode a link layer of an input/output controller in the electronic device is powered off, wherein the link layer of the input/output controller is not provided in the network interface controller;
in response to the wake message, the network interface controller providing a wake indication to wakeup logic via a system management bus (SMBus), wherein the wakeup logic is separate from the input/output controller and wherein the input/output controller is coupled to the SMBus, and an interface of the input/output controller to the SMBus is powered off in the lower power mode; and
in response to the wake indication, the wakeup logic activating an indication to cause the input/output controller to awaken the electronic device from the lower power mode, wherein the link layer is powered on when the electronic device is awakened.

12. The method of claim 11, further comprising:
the link layer when powered on cooperating with the physical layer to communicate data over the network.

13. The method of claim 11, further comprising:
a physical layer in the network interface controller sending the wake message to a wake message detector in the network interface controller; and
the wake message detector determining whether the wake message is targeted to the electronic device, wherein providing the wake indication is in response to the wake message determining that the wake message is targeted to the electronic device.

14. The method of claim 11, wherein the interface of the input/output controller to the SMBus is incapable of recognizing the wake indication while the first portion is powered off.

15. The method of claim 11, wherein the activated indication is provided to a general purpose input/output (GPIO) interface of the input/output controller.

16. The method of claim 11, wherein the network interface controller is implemented on an integrated circuit chip.

17. An electronic device comprising:
a network interface controller having a physical layer to connect to a network, wherein the network interface controller further includes a wake message detector to detect a wake message communicated over the network;
an input/output controller having a link layer that along with the physical layer are part of a communication stack of the electronic device to perform communication over the network, wherein the link layer is powered off in a lower power mode of the electronic device;
wakeup logic separate from the input/output controller, wherein the wakeup logic is interposed between the network interface controller and the input/output controller; and
a system management bus (SMBus) connected between the wakeup logic and the network interface controller and connected between the wakeup logic and the input/output controller, and an interface of the input/output controller to the SMBus is powered off in the lower power mode, wherein the wakeup logic is responsive to a wake indication over the SMBus from the wake message detector to assert an indication to the input/output controller to cause the input/output controller to awaken the electronic device from the lower power mode,
wherein the wake message detector is responsive to the wake message to assert the wake indication.

18. The electronic device of claim 17, wherein the network interface controller is implemented on an integrated circuit chip.

19. The electronic device of claim 17, wherein the asserted indication is provided to a general purpose input/output (GPIO) interface of the input/output controller.

* * * * *